United States Patent [19]

Nuttall

[11] Patent Number: 5,112,182
[45] Date of Patent: May 12, 1992

[54] POWER ACTIVATED DROP-NOSE TRAILER

[76] Inventor: William H. Nuttall, P.O. Box 267, Atoka, Okla. 75425

[21] Appl. No.: 267,031

[22] Filed: Nov. 4, 1988

[51] Int. Cl.$^5$ .............................................. B60P 1/04
[52] U.S. Cl. ................................. 414/481; 280/429; 414/482; 414/474; 414/480; 414/484
[58] Field of Search ............... 414/474, 475, 476, 480, 414/481, 482, 483, 485, 484, 786, 469; 280/423, 425.1, 81.1, 425.2, 429, 431; 296/181, 182, 183

[56] References Cited

U.S. PATENT DOCUMENTS

| | | | |
|---|---|---|---|
| 2,363,851 | 11/1944 | Barnhart et al. | 280/429 X |
| 3,292,803 | 12/1966 | Keller et al. | 414/484 |
| 3,430,791 | 3/1969 | Moss | 414/474 |
| 3,756,443 | 9/1973 | Verschage et al. | 414/481 |
| 3,883,019 | 5/1975 | Hansen, Jr. | |
| 3,894,645 | 7/1975 | Verschage. | |
| 3,894,747 | 7/1975 | Wisdom et al. | 414/482 X |
| 3,981,408 | 9/1976 | Chisom | 414/475 |
| 4,568,235 | 2/1986 | Bills, Jr. | 414/482 X |

FOREIGN PATENT DOCUMENTS

| | | | |
|---|---|---|---|
| 1755729 | 4/1974 | Fed. Rep. of Germany | 414/482 |
| 1365929 | 5/1964 | France | 414/480 |
| 2371315 | 7/1978 | France | 414/481 |
| 2411753 | 8/1979 | France | 414/481 |
| 2107274 | 4/1983 | United Kingdom. | |

Primary Examiner—Frank E. Werner
Attorney, Agent, or Firm—Ronald B. Sefrna

[57] ABSTRACT

The present invention provides a non-articulating low load platform trailer longitudinally divided into three load carrying segments; a rear load platform, a front coupling platform, and an inclined transitional platform between the coupling platform and the load platform. The trailer of the invention includes a self-contained power actuated lifting mechanism for the purpose of lowering the nose of the trailer to the ground without articulation of the trailer body to facilitate loading and unloading, and for the purpose of raising the nose of the trailer from the ground. The lifting mechanism includes lever arms configured to increase the vertical component of lifting force exerted by lift actuators, and further includes leverage links disposed between the lift actuators and lever arms for the purpose of further increasing the vertical component of lifting force when the nose of the trailer is near the ground.

20 Claims, 4 Drawing Sheets

POWER ACTIVATED DROP-NOSE TRAILER

FIELD OF THE INVENTION

The present invention generally relates to trailers intended for the transportation of equipment and other heavy loads, and in one of its aspects relates to a low load platform trailer including a mechanism for the lowering and raising of the nose of the trailer to facilitate loading and unloading of the trailer and attachment of the trailer to a towing vehicle.

BACKGROUND OF THE INVENTION

The use of heavy duty trailers and semi-trailers for transportation of heavy and/or bulky loads is very well known in the industry, and various types of such trailers and semi-trailers (referred to herein as "trailers" for convenience) have been developed in response to specific needs and problems related to various types of loads. Particularly, trailers designed to provide a load carrying platform or bed disposed low to the ground in order to achieve a lowered center of mass have been and continue to be widely used for the transportation of heavy construction or industrial equipment, which is typically characterized by a combination of bulky size, heavy weight, and relatively high center of mass. The design most commonly used to provide a lowered load platform is known as a gooseneck design, in which the nose of the trailer is at the height of the tow tractor or truck coupling mechanism and is interconnected to the lowered load platform through a vertical or slanted member.

Because of the size and weight of the equipment which is typically transported on such trailers, it is often impractical or impossible to hoist the equipment onto the trailer, and, because such equipment is often loaded and unloaded in the field, it is often equally impractical or impossible to utilize a loading dock or suitable loading ramp to drive the equipment onto the trailer. As a result, various means of lowering the nose, or coupling end, of the trailer to or near the ground, to allow equipment to be driven or winched onto the trailer, have been devised.

The most common approach known in the prior art is a heavy duty "gooseneck" type trailer provided with a folding neck, as illustrated by U.S. Pat. No. 3,756,443 to Verschage, et.al., U.S. Pat. No. 3,883,019 to Hansen, Jr., and U.S. Pat. No. 3,894,645 to verschage. Trailers made in accordance with this approach suffer from the disadvantage of limited useable load space on the bed of the trailer, as a result of the inability to carry any load over or on the neck portion of those trailers. Those trailers have the additional disadvantages of relatively high cost and maintenance requirements, arising from the mechanical complexity of the folding neck arrangements.

Another approach to facilitate the loading of equipment onto a trailer involves lowering of one end of the trailer to the ground, wherein the trailer pivots on its road wheels. One example of this general approach is found in French Patent No. 2,371,315 to Gatserelia, in which a multi-stage telescoping prop is disposed near the front or nose of the trailer for the purpose of providing a direct lifting force to raise and lower the nose of the trailer. Another example is found in British Patent No. 2,107,274 to Jones, which discloses a pivoting support leg disposed near the nose of the trailer and actuated by a hydraulic or pneumatic arm. During operation of the pivoting support leg designs of the prior art the trailer does not move longitudinally relative to the ground, and the ground contact end of each support leg is forced to move along the ground as the nose of the trailer is raised or lowered. To facilitate such movement, the ground contact end of each support leg is typically provided with one or more small wheels which are intended to roll along the ground surface.

While the general approach of providing a non-articulated trailer with one end adapted to be dropped to the ground offers advantages over the folding gooseneck approach, the specific designs of the prior art are prone to their own set of disadvantages. Both the direct lift approach and the pivoting support leg approach of the prior art have been associated with a relatively high load platform height to provide sufficient ground clearance for operation of their lifting mechanisms. The need for the ground contact end of each support leg of the pivoting support designs to move along the ground often presents problems, especially when used on a relatively soft unpaved surface, as the end of each support leg displays a pronounced tendency to dig itself into the ground rather than rolling over it. With heavy trailer loads, this problem may become rather severe, even on paved surfaces. Further partially as a result of problems with movement of the ground contact end of each support leg over the ground, the pivoting support leg designs known in the prior art suffer significantly from leverage disadvantage, and the load carrying capacity of the trailer itself may well exceed the effective working capacity of the lift actuating mechanism.

Accordingly, there has remained a need in the industry for a power actuated drop-nose trailer which allows the complete platform of the trailer to be utilized, which provides a low center of mass, and which provides a lifting mechanism capacity closely compatible with the load carrying capacity of the trailer itself.

SUMMARY OF THE INVENTION

The present invention provides a trailer of low load platform design which is adapted to allow the nose of the trailer to be lowered completely to the ground for the loading and unloading of equipment, without the necessity of altering the configuration of the trailer through the folding or detachment of the neck of the trailer. The trailer of the invention also includes a self-contained power actuated lifting mechanism for the controlled lowering and raising of the trailer. The lifting mechanism component of the invention is adapted to require minimal clearance between the trailer structure and the ground for its operation while still providing a lifting force equal to or greater than the load carrying capacity of the trailer structure itself.

The body of the trailer includes a plurality of elongate longitudinal frame members disposed in spaced parallel relation to one another and parallel to the longitudinal axis of the trailer. The body of the trailer further includes a plurality of decking plates spanning the longitudinal frame members of the trailer and interconnected thereto.

The body of the trailer is supported at one end, being the rear of the trailer, by one or more conventional axle assemblies, interconnected to the frame of the trailer by conventional suspension means, and by conventional wheels and tires removeably attached to the one or more axle assemblies. The opposite end of the trailer, being the nose of the trailer, is provided with a conventional trailer coupling device adapted to be compatible with the coupling device of the tow vehicle to be employed for transport of the trailer and any load placed thereon.

The body of the trailer of the invention is longitudinally divided into three sections comprising a coupling platform extending from the nose of the trailer toward the rear, a load platform extending the majority of the length of the body of the trailer from the rear toward the nose, and an inclined transitional section interconnected between the coupling platform and the load platform at a fixed angle relative to the planes of those platforms. With the trailer coupled to a suitable tow vehicle the plane of the coupling platform and the plane of the load platform are both approximately parallel to the plane of the ground upon which the trailer rests, with the height of the plane of the coupling platform above the ground being greater than the height of the plane of the load platform above the ground. The length of the transitional section of the body of the trailer should be adapted such that the slope of the transitional section does not preclude carrying of loads thereon.

The trailer of the invention further includes a power actuated lifting mechanism adapted to the purpose of raising and lowering the nose of the body of the trailer from and to the ground. The lifting mechanism generally comprises a landing gear assembly which includes a plurality of lever arms, each pivotally interconnected at one end to a longitudinal frame member of the trailer and pivotally interconnected at its opposite end to a ground support plate. The lifting mechanism further includes one or more actuating assemblies, each pivotally interconnected between the body of the trailer and the landing gear assembly of the lifting mechanism so as to effect rotation of the landing gear assembly about its pivotal interconnection to the body of the trailer upon activation of the one or more actuating assemblies. During operation of the lifting mechanism of the trailer of the invention, the ground support plate remains in a fixed position on the ground as the nose of the trailer body is raised and lowered, and the trailer body is caused to move forward and backward by rolling on the wheels and tires at the rear of the trailer. Because of the relatively large ground support area provided by the tires of the trailer and the free rotation of the wheels on their axles, the ground resistance associated with raising and lowering of the nose of the trailer is substantially reduced.

The structure and advantages of the power actuated drop-nose trailer of the invention is disclosed in more detail with reference to the preferred embodiment of the trailer of the invention depicted in the accompanying drawing figures.

DETAILED DESCRIPTION OF THE INVENTION

Referring now to the accompanying drawing figures, the power actuated drop nose trailer of the invention, generally designated by reference numeral 10, will be seen to comprise the basic components of trailer body 12, running gear assembly 14, and lifting mechanism 16. Trailer body 12 is longitudinally divided into three segments, a coupling platform 18, a load platform 20, and a transitional platform 22. In its preferred embodiment, trailer 10 is designed as a low load platform trailer, characterized by positioning of load platform 20 close to the ground, so as to provide a low center of mass of trailer 10 and its associated load and improve the lateral stability of trailer 10 and its load during transport by a tow vehicle.

Figure 1:
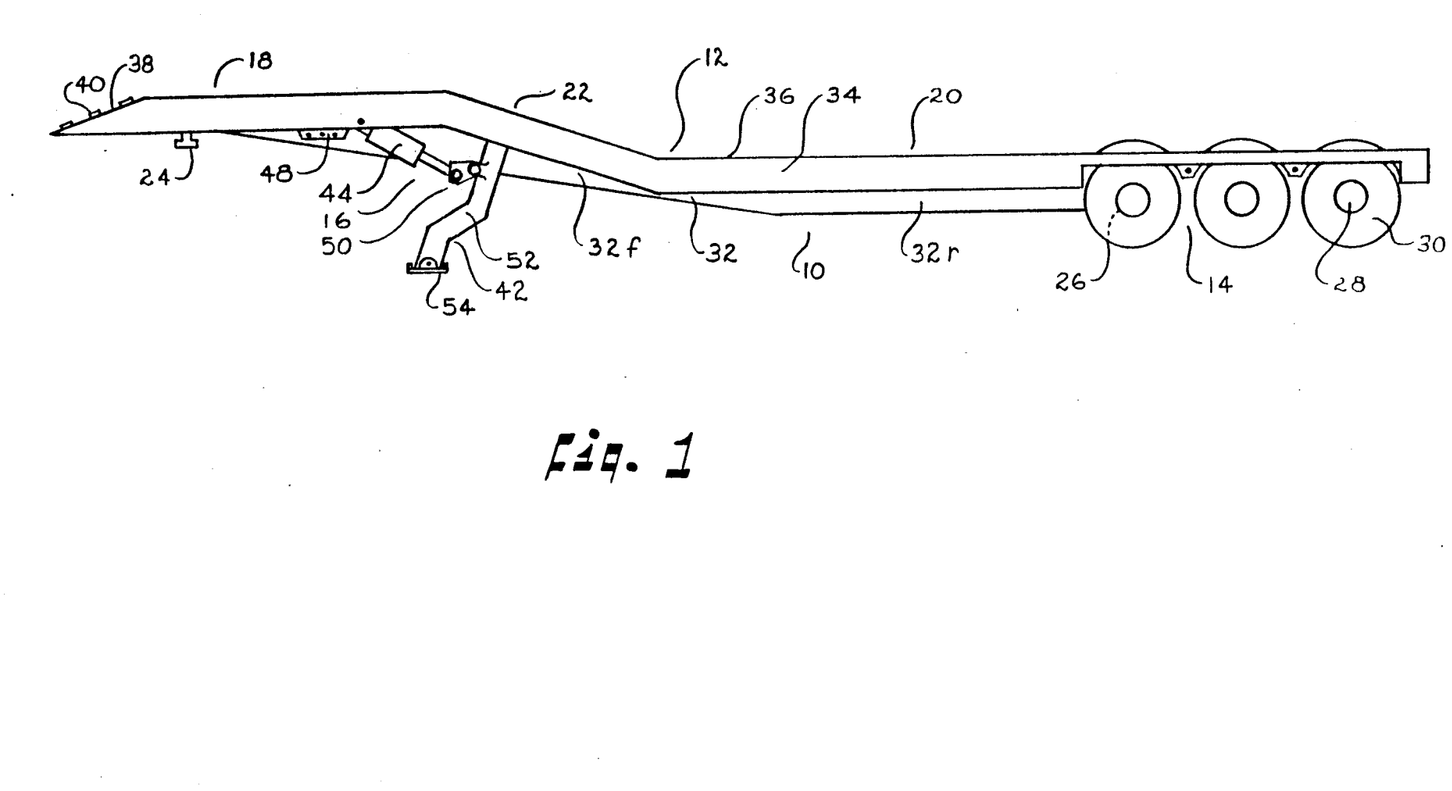
FIG. 1 is a side elevation view of the preferred embodiment of the trailer of the invention with the nose of the trailer in a raised position.

With trailer 10 in a raised position, as depicted in FIGURE 1, for attachment to a tow vehicle, the plane of load platform 20 is approximately parallel to the ground, and the plane of coupling platform 18 is parallel to the plane of load platform 20. Load platform 20 extends from the rear of the trailer body 12 toward the nose through a majority of the length of trailer body 12, so that the major portion of the load to be placed upon trailer 10 may be carried relatively near the ground for maximum stability. Coupling platform 18 extends from the nose of trailer body 12 toward the rear thereof a sufficient distance to extend rearward past the rear of the tow vehicle to be attached thereto and prevent interference between the tow vehicle and the lowered segments of trailer body 12. Coupling platform 18 includes a conventional semi-trailer coupler 24 extending downward therefrom and rigidly interconnected thereto on the longitudinal axis of trailer body 12 an appropriate distance rearward from the nose of trailer body 12 for coupling trailer 10 to a conventionally designed tow vehicle, which supports the nose of trailer 10. The rear of trailer 10 is supported by running gear 14, which comprises a plurality of spring suspended axles 26, wheels 28, and tires 30, all of conventional design.

Transitional platform 22 is rigidly interconnected between coupling platform 18 and load platform 20, with the plane of transitional platform 22 at an incline relative to the parallel planes of coupling platform 18 and load platform 20. The length of transitional platform 22 is adapted such that the slope of transitional platform 22 is at a sufficiently low angle to allow the placement and transport of loads thereon. It will be noted by those skilled in the art that the non-articulating design of trailer body 12, with its rigidly interconnected coupling platform 18, transitional platform 22, and load platform 20, and the gentle slope of transitional platform 22 allows the entire length of trailer 10 to be utilized for load placement and transport.

Trailer body 12 structurally comprises a pair of longitudinal main beams 32 mutually parallel to and disposed with one of said main beams 32 on either side of the longitudinal axis of trailer 10. Trailer body 12 further includes a pair of side beams 34 extending the full length of trailer body 12, with each of said side beams 34 defining one of the side edges of interconnected platforms 18, 20, and 22. In the preferred embodiment of trailer 10, main beams 32 and side beams 34 are rigidly interconnected by means of a plurality of decking plates 36, each extending from one of side beams 34 to the other side beam 34 across both main beams 32, and interconnected to the upper edge of each of said beams. Decking plates 36 may fully cover the upper surface of trailer body 12 or, alternatively, may be partially omitted between main beams 32. In addition to the interconnection provided by decking plates 36, trailer body 12 may be provided with a plurality of cross beams (not shown) each extending between and rigidly interconnected to a respective two of the longitudinally extending beams of trailer body 12. In order to facilitate the loading and unloading of trailer 10 with its nose in a lowered position, the nose end of coupling platform 18 is adapted to form inclined ramps 38, which are preferably provided with a plurality of cleats 40. The width of each of ramps 38 from the respective edge of trailer body 12 toward its longitudinal axis should be sufficient to accommodate the wheel or track spacing of equipment to be driven onto trailer 10.

Each of side beams 34 of trailer body 12 is longitudinally divided into three segments corresponding to the segments of trailer body 12, and each of side beams 34 is of the same dimension from its lower edge to its top edge throughout its length. Each of main beams 32 is longitudinally divided into two segments, a rear segment 32r and a front segment 32f. Main beam rear segments 32r extend from the rear of trailer body 12 toward the intersection between load platform 20 and transitional platform 22 through a majority of the length of load platform 20. The dimension of each of main beam rear segments 32r from its lower edge to its upper edge remains the same through the length of each segment 32r. Main beam segments 32f extend from their beginning at or near the nose of trailer body 12 to the intersection of segments 32f and 32r, spanning the intersection between coupling platform 18 and transitional platform 22 and the intersection between transitional platform 22 and load platform 20. The upper edge of each of main beam segments 32f is configured through the length of segments 32f to be in alignment with the upper edges of side beams 34 in the planes defined by the upper edges of side beams 34 and the lower surfaces of respective decking plates 36. The lower edge of each of main beam segments 32f defines a straight line from the end of each segment at or near the nose of trailer body 12 to the intersection between segments 32f and 32r of each main beam 32. Segments 32f and 32r of each main beam 32 are rigidly interconnected at their intersection, such that each main beam 32 provides continuous support throughout essentially the full length of trailer body 12. The disclosed configuration of segments 32f of main beams 32 is such that a significant portion of the lower edge of each segment 32f is in contact with the ground with the nose of trailer 10 in a lowered position, so that coupling platform 18 and transitional platform 22 are firmly supported against the ground during loading or unloading of trailer 10 and the chance of failure of the interconnection between said platforms and associated segments of side beams 34 is substantially reduced.

The nose of trailer 10 is raised and lowered by self-contained lifting mechanism 16, which includes, in the preferred embodiment of trailer 10, the components of landing gear 42, actuator means 44, power unit 46, control unit 48, and leverage links 50. In the preferred embodiment of the invention, landing gear 42 includes a pair of elongate lever arms 52, each pivotally interconnected at its first end to trailer body 12 and pivotally interconnected at its second end to ground support plate 54. Each of lever arms 52 is of dog-leg or offset configuration and is divided over its length into three end to end segments; a first segment extending from the first end of each lever arm 52 through approximately half the length of lever arm 52, a second segment disposed with its longitudinal axis at an angle of approximately 30 degrees to 45 degrees relative to the longitudinal axis of said first segment and interconnected to or integral with said first segment, and a third segment disposed such that the longitudinal axis of said third segment is parallel to the longitudinal axis of said first segment and interconnected to or integral with said second segment. Each of lever arms 52 is interconnected to trailer body 12 such that the second end of each said lever arm is disposed nearer the nose of trailer body 12 than is the first end of each said lever arm. For maximum stability, each of lever arms 52 should be disposed near the respective side of trailer body 12, with their pivotal interconnections to trailer body 12 coaxially aligned on an axis perpendicular to the longitudinal axis of trailer body 12. Such pivotal interconnections between the first ends of lever arms 52 and trailer body 12 may be made by any convenient conventional means. Landing gear 42 further includes ground support plate 54, which comprises an elongate plate with a length equal to or slightly greater than the distance between the second ends of lever arms 52 but not greater than the width of trailer body 12 and a width sufficient to support the weight imposed by loaded trailer 10 without significant penetration of ground support plate 54 into the ground or paving upon which it rests. Ground support plate 54 is interconnected to lever arms 52 by means of a pivotal interconnection formed between each said lever arm and said ground support plate at or near each end of said ground support plate.

In the preferred embodiment of trailer 10, actuator means 44 comprises a pair of hydraulic cylinder and piston assemblies, each pivotally interconnected between one of lever arms 52 and trailer body 12, but it will be understood that various alternative embodiments of actuator means 44 may be employed without departing from the scope of the invention. Such alternative embodiments may readily include pneumatic cylinder and piston assemblies as but one example. In the preferred hydraulic cylinder and piston embodiment, the cylinder of each assembly is pivotally interconnected to trailer body 12 and the piston of each assembly is pivotally interconnected to one of lever arms 52 intermediate the first end of said lever arm and the intersection of the first and second segments of said lever arm, such that upon activation of actuating means 44 each said lever arm is caused to rotate about the pivotal interconnection between the first end of each lever arm 52 and trailer body 12.

Power unit 46 of lifting mechanism 16 is adapted to supply activating power to actuating means 44 of trailer 10. In the preferred embodiment of trailer 10, in which actuating means 44 comprise hydraulic cylinder and piston assemblies, power unit 46 comprises a power source, a hydraulic fluid pump, and a hydraulic fluid reservoir, all disposed under decking plates 36 near the intersection between coupling platform 18 and transitional platform 22. The preferred power source comprises a small internal combustion engine and fuel source. With such conventional output components and control system as appropriate for driving the hydraulic fluid pump so as to supply the required supply of pressurized hydraulic fluid for activation of actuating means 44. Alternative embodiments of the power source may be readily employed, however, such as an electrically operated motor and storage battery, and it will be noted that various power sources may be employed alternatively with the various embodiments of actuator means 44 which fall within the scope of the invention. As non-limiting examples, a pneumatic system may include an air accumulator charged by one or more air pumps driven by the rotation of one or more of wheels 28 during transport of trailer 10, or an electrically operated system may include a storage battery charged by one or more generators driven by the rotation of one or more of wheels 28.

Control unit 48 of lifting mechanism 16 comprises a conventional system adapted to allow full operator control of the activation of actuator means 44, and appropriate operation and status indicator devices, such as fuel gauge(s), pressure gauge(s), battery status indicator(s) and the like. In the preferred embodiment of trailer 10, control unit 48 includes a conventional hydraulic control valve assembly allowing full operator control of the direction of movement of the hydraulic pistons relative to the cylinders of actuator means 44 as well as control of the rate of activation of such actuator means, and control unit 48 further includes a fuel gauge and engine start/kill controls.

Figure 2:
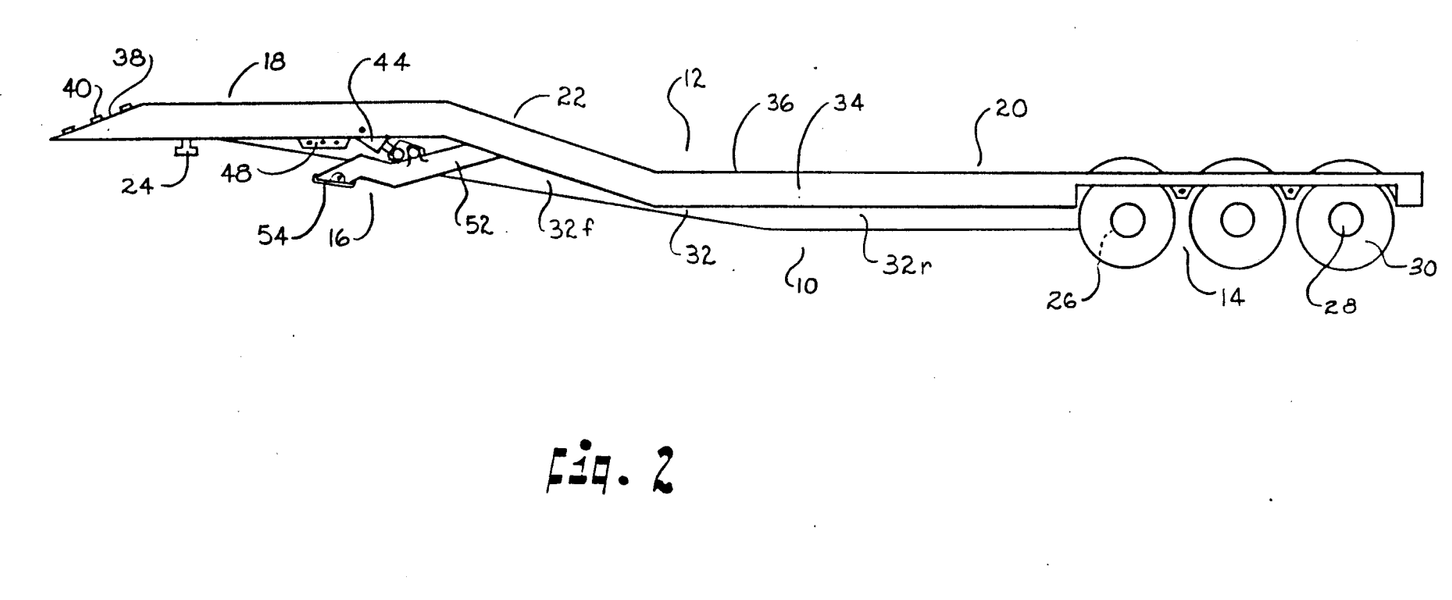
FIG. 2 is a side elevation view of the preferred embodiment of the trailer of the invention with the nose of the trailer in a lowered position.
Figure 3:
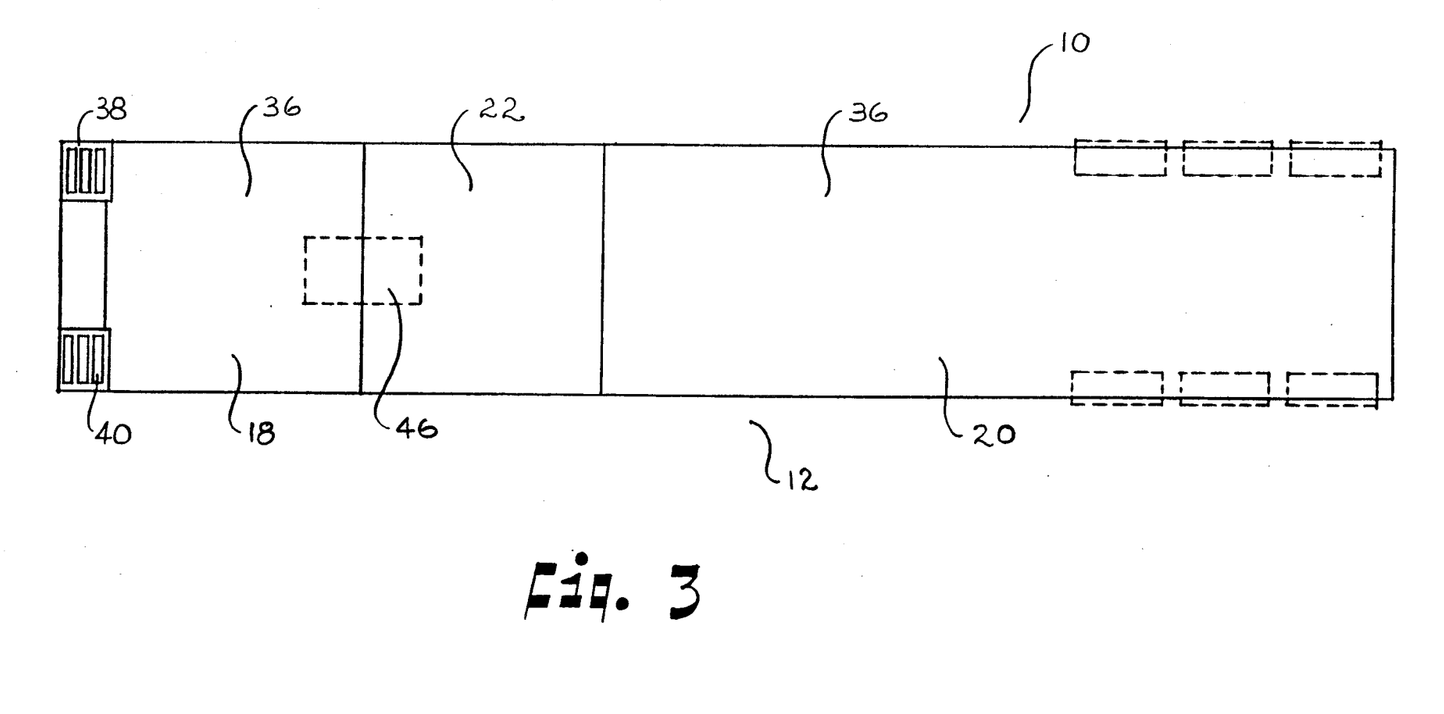
FIG. 3 is a plan view of the preferred embodiment of the trailer of the invention with the nose of the trailer in a raised position.
Figure 4:
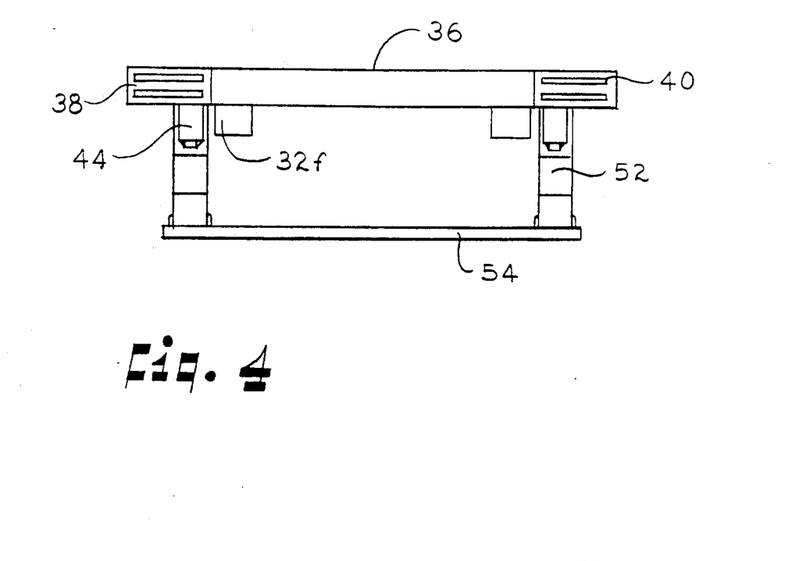
FIG. 4 is a front elevation view of the preferred embodiment of the trailer of the invention, showing the lifting mechanism component of the invention.

Although the pivotal interconnections between actuator means 44 and lever arms 52 of lifting mechanism 16 may be made directly between the respective ends of actuator means 44 and lever arms 52, the preferred embodiment of trailer 10 includes leverage links 50, designed to increase the vertical component of the lifting force supplied by actuator means 44 to lever arms 52 as raising of the nose of trailer 10 from a fully lowered position, as depicted in FIG. 2, is initiated. As can be inferred from the relative positions of actuating means 44 and lever arms 52 shown in FIG. 2, as actuating means 44 are first activated to raise the nose of trailer 10, the horizontal component of the actuating force is of substantially greater magnitude than the vertical, or lifting, component of such force, and the total capacity of actuating means 44 must be substantially greater than the direct vertical force required to raise the nose of trailer 10. Some improvement in the relationship of total actuating means capacity to required vertical lifting force is achieved through the disclosed preferred dogleg configuration of lever arms 52 and the disclosed position of the pivotal interconnection between actuating means 44 and lever arms 52, which interact to minimize the angular separation of the longitudinal axis of actuating means 44 and of the longitudinal axis of the first segment of lever arms 52 from the vertical with the nose of trailer 10 in a lowered position. Further improvement is achieved in the preferred embodiment of trailer 10 through the inclusion of leverage links 50 to form the pivotal interconnection between actuating means 44 and lever arms 52.

Figure 5:
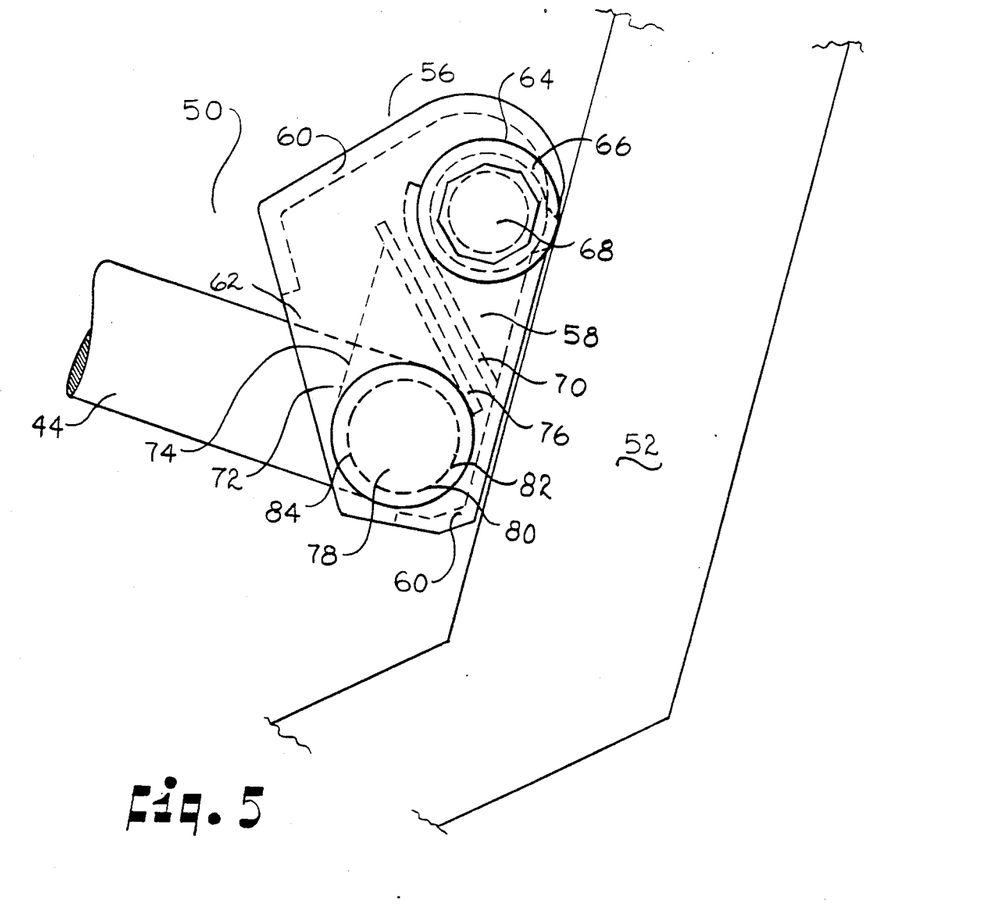
FIG. 5 is a partial elevation view of the lifting mechanism of the preferred embodiment of the trailer of the invention, showing the leverage link component of the lifting mechanism.

Each of leverage links 50 comprises hollow body 56, having a pair of opposed planar side walls 58, configured as depicted in FIG. 5, separated by a distance greater than the crosssectional dimension of the piston of the hydraulic cylinder and piston actuating means 44 and interconnected by closure plate 60 extending between said side walls at their outer edges and extending around a portion of the perimeter of hollow body 56 so as to leave a slot-like opening 62 into the interior of hollow body 56. Side walls 58 are penetrated by coaxially aligned apertures 64 disposed near the edges of side walls 58 opposite opening 62, and open-ended hollow tube 66 extends through apertures 64 and is interconnected to each of side walls 58. Each leverage link 50 is pivotally interconnected to a lever arm 52 by means of pin 68 which extends through the interior of tube 66 and through matching apertures provided in mounting flanges interconnected to each lever arm 52. The edges of side walls 58 and closure plate 60 of each leverage link are curved in the area of the interconnection between body 56 and each lever arm 52, to allow rotation of body 56 around pin 68 without interference with any portion of lever arm 52. Each leverage link 50 also includes slide plate 70 disposed in the interior of body 56 and interconnected between side walls 58 and between tube 66 and closure plate 60, as illustrated in FIG. 5.

Each leverage link 50 additionally includes bearing block 72, which comprises a pair of support plates 74 in separated parallel relation disposed between and parallel to side walls 58, and bearing plate 76 interconnected to support plates 74 in perpendicular relation thereto. Support plates 74 are configured such that bearing plate 76 is parallel to and slightly separated from slide plate 70 with the nose of trailer 10 in a lowered position. The distance of separation between support plates 74 is slightly greater than the cross-sectional dimension of the end of actuating means 44, which is received therebetween. Bearing block 72 is pivotally interconnected between side walls 58 and the end of actuating means 44 is pivotally interconnected between support plates 74 by means of pin 78 extending through coaxially aligned apertures 80, 82, and 84 in side walls 58, in support plates 74, and in the end of actuating means 44, respectively.

Leverage links 50 operate by effectively altering the point of interconnection between each actuating means 44 and each lever arm 52 as the nose of trailer 10 is raised and lowered. With the nose of trailer 10 in a lowered position, each leverage link 50 is disposed against its respective lever arm 52, such that upon activation of actuating means 44 the effective point of application of the actuating, or lifting force, is nearer the second ends of lever arms 52 than the point of interconnection between each leverage link to each lever arm, increasing the vertical component of such force. As activation of actuating means 44 is continued and the angle between the actuating means and the lever arms is changed, bearing block 72 rotates about pin 78, bringing bearing plate 76 out of parallel alignment with and into contact with slide plate 70. With further activation of actuating means 44, the force between bearing plate 76 and slide plate 70 induces rotation about pins 68 and 78, with resulting movement of leverage link 50 from its rest position against lever arm 52 and effective shift of force against lever arm 52 to the position of interconnection between lever arm 52 and leverage link 50. Use of leverage link 50 thus allows the length of actuating means 44 to be minimized, thus minimizing the departure of the longitudinal axis of actuating means 44 from the vertical with the nose of trailer 10 in a lowered position.

In operation of the lifting mechanism of the preferred embodiment of trailer 10 in order to raise the nose of trailer 10 from a lowered position, power unit 46 is started and the hydraulic piston-cylinder actuating means 44 are activated through control unit 48 for extension of the pistons from the cylinders, resulting in the application of lifting force between trailer body 12 and ground through lever arms 52 and ground support plate 54 to raise the nose of trailer 10 from the ground to a height suitable for attachment of a towing vehicle. After transportation of a load, trailer 10 may be lowered by first lowering landing gear 42 to bring the ground support plate 54 into contact with the ground or pavement surface, disconnecting trailer 10 from the towing vehicle and moving the towing vehicle away from the nose of the trailer, and activating the lifting mechanism 10 actuating means 44 for withdrawal of the pistons into the cylinders of the actuating means until the nose of trailer 10 is in contact with the ground. During the raising and lowering of the nose of trailer 10, ground support plate 54 remains in a fixed position relative to the ground and trailer body 12 is caused to move along its longitudinal axis as lever arms 52 rotate about their pivotal interconnection to trailer body 12, with corresponding rotation of wheels 28 and tires 30 and rolling of tires 30 along the ground. Since rotation of wheels and tires 28 and 30 produce substantially lower frictional resistance than movement of ground support plate 54, or of small wheels in place thereof, along the ground, the required actuating means capacity is reduced through the operational approach of the present invention. The effects of configuration of lever arms 52, inclusion of leverage links 50, and reduced ground resistance afforded by longitudinal movement of trailer body 12 during operation of lifting mechanism 16, combine in the design of trailer 10 to increase the trailer load capacity for any given actuating means capacity and size.

It will be understood that, in addition to raising and lowering the nose of trailer 10 with the trailer disconnected from a tow vehicle, lifting mechanism 16 may also be advantageously used to raise the rear wheels and tires of an attached tow vehicle from the ground by continued activation of actuating means 44. This ability to raise the rear of the tow vehicle may greatly facilitate the performance of, especially, emergency repairs to the tow vehicle, and may further greatly facilitate freeing a tow vehicle which has become mired in soft soil or mud.

The foregoing description of the preferred embodiment and various alternative embodiments of the power actuated drop-nose trailer of the invention is illustrative and not for purposes of limitation, and it will be understood that the invention is susceptible to other embodiments and modifications without departing from the scope and spirit of the invention as claimed.

What is claimed is:

1. A power actuated drop nose trailer, comprising
an elongate body with a nose and a rear, having a main load platform disposed low to the ground surface extending from the rear of said body a majority of the distance toward the nose of said body, a load carrying coupling platform disposed at a greater height from the ground surface than said main load platform and parallel to said main load platform, and a load carrying transitional platform rigidly interconnected between the end of said main load platform nearest the nose of said body and the end of said coupling platform nearest the rear of said body, with said translational platform disposed at an angle relative to said main load and coupling platforms, said body further including a plurality of longitudinal main beams with their upper edges in the planes defined by the respective platforms of said body and their lower edges configured to support said body upon the ground surface through the portion of the length of said lower edges of said main beams underlying the interconnections between said platforms with the nose of said body lowered to the ground surface, and a pair of longitudinal side beams disposed parallel to said main beams with one of said side beams along each edge of said body;
coupling means extending downward from said coupling platform near the nose of said body for the purpose of coupling the trailer to a two vehicle;
running gear disposed near the rear of said body, including a plurality of axle assemblies disposed perpendicular to the longitudinal axis of said body, a plurality of suspension means, a plurality of wheels, and a plurality of tires equal in number to the number of said wheels;
a landing gear assembly disposed between said body and the ground surface, inciting a plurality of lever arms having first and second ends, pivotally interconnected at their first ends to said body between said side beams with the point of interconnection intermediate the two ends of said transitional platform of said body, an elongate ground support plate disposed with its longitudinal axis perpendicular to the longitudinal axis of said body and pivotally interconnected to the second end of each of said lever arms; and
one or more actuating means each having first and second ends, with the first end of each actuating means pivotally interconnected to the lower surface of said body between the nose of said body and the interconnection of said lever arms to said body, and with the second end of each actuating means pivotally interconnected to one or more of said lever arms of said landing gear intermediate said first and second ends thereof, for the purpose of applying force between said body and said lever arms and inducing rotation of said lever arms about their pivotal interconnection to said body to effect raising or lowering of the nose of said body to or from the ground surface.

2. The power actuated drop nose trailer of claim 1, further comprising leverage link means, having first and second ends, pivotally interconnected between each of said one or more actuating means and said one or more of said lever arms with the first end of each said leverage link means pivotally interconnected to the second end of each said actuating means and with the second end of each said leverage link means pivotally interconnected to the respective one or more of said lever arms for the purpose of maximizing the vertical component of force applied between said body and said lever arms to initiate raising of the nose of said body from the ground surface.

3. The power actuated drop nose trailer of claim 1, wherein each of said lever arms of said landing gear includes three interconnected longitudinal segments, a first segment extending from said first end of said lever arm toward the midpoint thereof, a second segment parallel to said first segment but offset therefrom toward the nose of said body, extending from said second end of said lever arm toward the midpoint thereof, and a third segment interconnected between said first and second segments at an angle thereto, and wherein the pivotal interconnection between each of said actuating means and each of said lever arms is made within the length of said first segment of said lever arm near the interconnection between said first and third segments of said lever arm.

4. The power actuated drop nose trailer of claim 1, wherein said actuating means comprise hydraulic cylinder and piston assemblies, a source of pressurized hydraulic fluid to be supplied to said hydraulic cylinder and piston assemblies, and control means for controlling the flow of pressurized hydraulic fluid to said hydraulic cylinder and piston assemblies.

5. The power actuated drop nose trailer of claim 1, wherein the length of said transitional platform in the plane thereof is not less than sixty percent of the length of said coupling platform in the plane thereof.

6. The power actuated drop nose trailer of claim 1, wherein the length of said transitional platform in the plane thereof is not less than seventy-five percent of the length of said coupling platform in the plane thereof.

7. In a power actuated drop nose trailer including a non-actuating body having three rigidly interconnected longitudinal segments disposed at varying heights from the ground surface, running gear disposed near the rear of the body, landing gear disposed near the nose of the body and pivotally interconnected thereto, and variable length actuating means, having first and second ends, pivotally interconnected between the body and the landing gear, with the first end of the actuating means connected to the body and the second end of the actuating means connected to the landing gear, for the purpose of applying force between the body and the landing gear to induce rotation of the landing gear about its pivotal interconnection to the body of the trailer and effectuate raising and lowering of the nose of the trailer from and to the ground surface, the improvement comprising:
- including within the landing gear of the trailer a plurality of elongate lever arms, each having at least two rigidly interconnected segments, said interconnected segments each being connected to an immediately adjacent segment and having the longitudinal axis of each segment disposed at an angle relative to the longitudinal axis of the immediately adjacent segment;
- including a leverage link with first and second ends interconnected between each actuating means and each said lever arm of the landing gear, with the first end of each said leverage link pivotally interconnected to the second end of each actuating means and the second end of each said leverage link pivotally interconnected to the respective lever arm, so as to allow said actuating means to be disposed to maximize the vertical component of force applied thereby to initiate raising the nose of the trailer from the ground surface; and
- positioning the point of interconnection between each said leverage link and each said lever arm so as to allow said actuating means to be disposed to maximize the vertical component of force applied thereby to initiate raising the nose of the trailer from the ground surface.

8. A power actuated drop nose trailer to be transported over paved or unpaved ground surface by a separate towing vehicle, comprising
an elongate body with a nose and a rear, having three rigidly interconnected load carrying segments including a main load platform extending from the rear a majority of the distance toward the nose of said body and disposed at a first height from and substantially parallel to the ground surface with the trailer attached to the towing vehicle, a coupling platform extending from the nose toward the rear of said body disposed parallel to and at a respectively greater height than said main load platform, and a transitional platform rigidly interconnected between the respective proximal ends of said main load platform and said coupling platform at an angle relative to the parallel planes of said respective platforms, with the length of said transitional platform in the plane thereof not less than fifty percent of the length of said coupling platform in the plane thereof, and said body further including a plurality of longitudinal main beams extending from the nose to the rear of said body parallel to and symmetrically spaced relative to the longitudinal axis of said body, with the upper edges of said main beams in the planes defined by said respective platforms;
coupling means interconnected to and extending downward from said coupling platform for the purpose of removably attaching the trailer to a suitable towing vehicle;
running gear disposed near the rear of said body of the trailer, including at least one pair of wheels and associated tires with each pair disposed in opposed relation across the longitudinal axis of said body and suspended therefrom so as to support the rear of said body and any load placed thereon above the ground surface with the trailer at rest, with or without a towing vehicle, or in transit;
a landing gear assembly for the purpose of supporting the nose portion of the trailer with the trailer at rest, including one or more lever arms having first and second ends, each said lever arm pivotally disposed nearer the nose than the rear of said body and interconnected at its first end to said body between said side beams on an axis perpendicular to the longitudinal axis of said body, and further including one or more ground support plates each pivotally interconnected to the second end of one or more lever arms; and
one or more actuating means for the purpose of inducing rotation of said one or more lever arms about said pivotal interconnections between each of said lever arms and said body and said ground support plate associated therewith, each of each actuating means having first and second ends, with the first end of each pivotally interconnected to said body on an axis perpendicular to the longitudinal axis of said body, and with the second end of each pivotally interconnected to one of said lever arms intermediate said first and second ends thereof, with said actuating means disposed and configured such that the entirety of said actuating means lies between the upper surface of the platform of said body immediately above the pivotal interconnection of said first end of said actuating means and said body and the ground surface with the nose of said body lowered to be in contact with the ground surface.

9. The power actuated drop nose trailer of claim 8, wherein the acute angle between the plane of said main load platform of said body and the plane of said transitional platform of said body is less than twenty degrees.

10. The power actuated drop nose trailer of claim 8, wherein the acute angle between the plane of said main load platform of said body and the plane of said transitional platform of said body is approximately equal to ten degrees.

11. The power actuated drop nose trailer of claim 8, wherein a flat plane mutually tangent to the outer circumference of each of the pair of tires of said running gear disposed nearest the nose of said body and tangent to the nose of said body does not intersect any component of the trailer with said landing gear of the trailer in a fully raised position.

12. The power actuated drop nose trailer of claim 8, further comprising self-contained activating means interconnected to the trailer for the purpose of activating said actuating means.

13. The power actuated drop nose trailer of claim 8, wherein each of said actuating means comprises a hydraulic cylinder and piston assembly.

14. The power actuated drop nose trailer of claim 8, wherein each of said actuating means is disposed such that the longitudinal axis of said actuating means crosses the longitudinal axis of the respective lever arm to which said actuating means is interconnected, and wherein each of said actuating means further includes a leverage link means with first and second ends pivotally interconnected between said actuating means and the respective lever arm of said landing gear with a pivotal interconnection between said second end of said actuating means and the first end of said leverage link and a pivotal interconnection between the second end of said leverage link and said lever arm, for the purpose of altering the point of imposition of actuating force on said lever arm during raising and lowering of the nose of the trailer so as to maximize the vertical component of such actuating force when the nose of the trailer is in a lowered position and to maximize the component of such actuating force acting perpendicular to the longitudinal axis of said lever arm at the point of interconnection of said leverage link means thereto as the nose of the trailer is raised toward a fully raised position.

15. The power actuated drop nose trailer of claim 8, wherein each of said lever arms of said landing gear includes two longitudinal segments each having a longitudinal axis, with said segments rigidly interconnected end to end such that an obtuse angle is formed between their respective longitudinal axes with the arc of such angle facing the body of the trailer when the landing gear is in a raised position relative to said body.

16. The power actuated drop nose trailer of claim 8, wherein each of said lever arms of said landing gear includes three longitudinal segments each having a longitudinal axis, being an upper segment extending from said first end of said lever arm toward the second end thereof, a lower segment extending from said second end of said lever arm toward the first end thereof, and a middle segment rigidly interconnected between the proximal ends of said upper and lower segments, said three segments being disposed in offset configuration with the longitudinal axes of said upper segment and said lower segment in parallel relation and the longitudinal axis of said middle segment at an angle relative thereto such that said lower segment is offset from said upper segment in the direction of the pivotal interconnection between said actuating means and the body of the trailer.

17. The power actuated drop nose trailer of claim 8, wherein each of said main beams includes two rigidly interconnected longitudinal segments, being a rear segment extending from the rear of the trailer toward the nose of the trailer through a majority of the length of said main load platform with the dimension of said rear segment between its upper and lower edges remaining substantially constant through its length, and a front segment extending from its interconnection to said rear segment toward the nose of the trailer through the full length of said transitional platform and through at least the majority of the length of said coupling platform, with the dimension of said front segment between its upper and lower edges varying through its length, such that the upper edge of said front segment is coincident with the plane of the lower surface of the respective platform of the body of the trailer at any point through the length of said front segment and the lower edge of said front segment defines a straight line between the interconnection of said front segment to said rear segment and the end point of said front segment at the nose of the trailer.

18. The power actuated drop nose trailer of claim 8, wherein said body further includes a plurality of cross beams disposed perpendicular to the longitudinal axis of said body and rigidly interconnected to the longitudinal beams of said body.

19. The power actuated drop nose trailer of claim 8, wherein said body further includes a pair of side beams disposed in opposed relation across the longitudinal axis of said body with each of said side beams extending along and aligned with a respective different one of the side edges of said body.

20. The power actuated drop nose trailer of claim 8, wherein the length of said transitional platform in the plane thereof is not less than seventy-vive percent of the length of said coupling platform in the plane thereof.

* * * * *